United States Patent [19]

Smith et al.

[11] Patent Number: 4,593,880
[45] Date of Patent: Jun. 10, 1986

[54] DEVICE FOR SUPPORTING A PREFORM INSERT IN A MOLD

[75] Inventors: Robert F. Smith, Dover, N.H.; Claude Bemis, York, Me.

[73] Assignee: Ex-Cell-O Corporation, Troy, Mich.

[21] Appl. No.: 674,440

[22] Filed: Nov. 23, 1984

Related U.S. Application Data

[63] Continuation of Ser. No. 465,557, Feb. 10, 1983, abandoned.

[51] Int. Cl.⁴ ............................................. B29C 33/12
[52] U.S. Cl. ...................................... 249/91; 249/83; 249/142; 249/177; 264/278; 425/117
[58] Field of Search .................... 249/91, 93, 94, 97, 249/177, 84, 96, 83, 38, 40, 43, 145, 146, 142, 63; 264/275, 278; 164/332-334; 425/110, 117, 125; 292/202, 228

[56] References Cited

U.S. PATENT DOCUMENTS

| 344,473 | 6/1886 | Bond | 292/202 |
|---|---|---|---|
| 386,549 | 7/1888 | Matthews | 292/202 |
| 473,354 | 4/1892 | Scheibel | 292/202 |
| 1,620,611 | 3/1927 | Dresner | 292/202 |
| 3,843,176 | 10/1974 | Gonzalez-Cuzan | 292/202 |
| 4,053,134 | 10/1977 | Peacock | 249/94 |
| 4,383,675 | 5/1983 | Fricker | 249/177 |

FOREIGN PATENT DOCUMENTS

| 139948 | 1/1961 | U.S.S.R. | 292/202 |
|---|---|---|---|
| 554379 | 4/1977 | U.S.S.R. | 249/219 R |

Primary Examiner—Jay H. Woo
Assistant Examiner—James C. Housel
Attorney, Agent, or Firm—John C. Evans

[57] ABSTRACT

The invention provides a device for supporting a mold insert in space inside a mold cavity. A pilot and keeper assembly rests on the top of a mold part and extends into a mold cavity and through a small hole in the mold insert. Movement of a handle, which is part of the pilot and keeper assembly of the mold part, is transmitted through a shaft to a retaining means, which engages the opposite extremity of the hole to retain the insert in position during molding operations. After plastic is inserted into the base of the mold cavity and a sufficient curing time has transpired, the handle is rotated back to its initial position, thereby returning the retaining means to a nonretention position, and the pilot and keeper assembly is withdrawn from the mold.

5 Claims, 4 Drawing Figures

DEVICE FOR SUPPORTING A PREFORM INSERT IN A MOLD

This application is a continuation of application Ser. No. 465,557, filed Feb. 10, 1983 and now abandoned.

TECHNICAL FIELD

The subject invention relates to an apparatus used in molding operations generally and, more specifically, to molding operations which incorporate means to hold molding inserts in place in the mold cavity.

BACKGROUND ART

A variety of molding apparatus is currently in use to accomplish an equally wide variety of molding operations. For example, the U.S. Pat. No. 4,053,134, to Peacock granted Oct. 11, 1977, is directed to a means to support eye-bolts in concrete piping molds prior to the insertion of concrete into the mold. However, the device according to the Peacock patent, relies upon a spring-loaded plunger to secure the eye-bolts in place in the mold, and, consequently, the apparatus must be bolted to the pipe mold itself to provide a counter force for the plunger spring to act against. The U.S. Pat. No. 3,339,609, to Cushman granted Sept. 5, 1967, is directed to a means to secure a floating nut assembly in a mold prior to the injection of molding material. While the Cushman device does not rely on spring-loaded plungers, and the device merely rests on the lid of the mold, there exists a support means that must be screwed into the floating nut insert. The practice of threadedly engaging the support means to the floating nut insert is a tedious and time-consuming process.

STATEMENT OF INVENTION AND ADVANTAGES

In accordance with the present invention, there is provided a mold assembly for molding a plastic part with an insert embedded or molded into the plastic part in the mold cavity. This assembly includes at least one mold part for defining a mold cavity to receive plastic material. An insert-supporting assembly is attached to this mold part and extends from the mold part down into the mold cavity to support a mold insert. The mold insert has a hole, through which the alignment means of the insert-supporting assembly extends to receive the insert. The hole in the insert is engaged, and retaining means on the insert-supporting assembly is movable between a receiving position allowing the hole in the insert to be disposed about the alignment means and a retaining position to engage the insert about the hole on the opposite extremity of the hole from the alignment means. Plastic material is then injected into the mold cavity.

An advantage of the present invention is that the insert-supporting assembly can support the mold insert with a minimum amount of perforations into the insert and resultant mold piece. Also, the insert support assembly is quickly positioned on the mold parts to properly locate the mold insert.

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
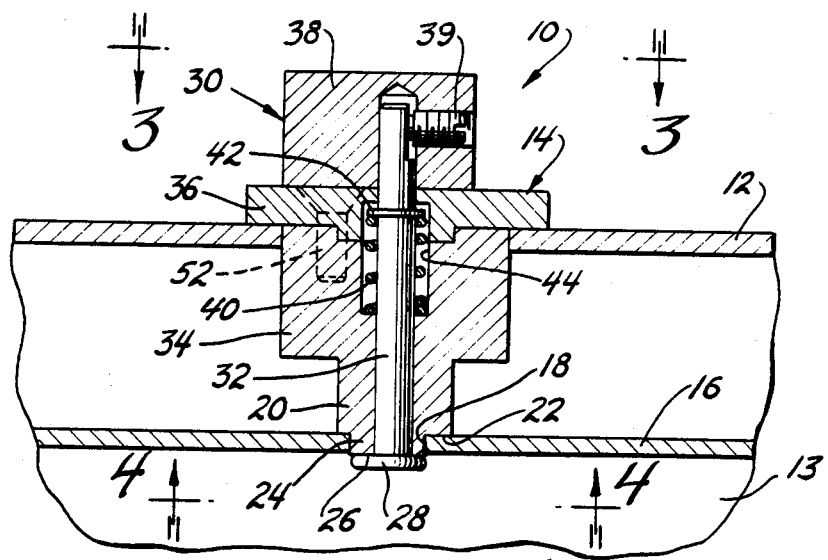
FIG. 1 is a side cross-sectional view of the subject invention.
Figure 2:
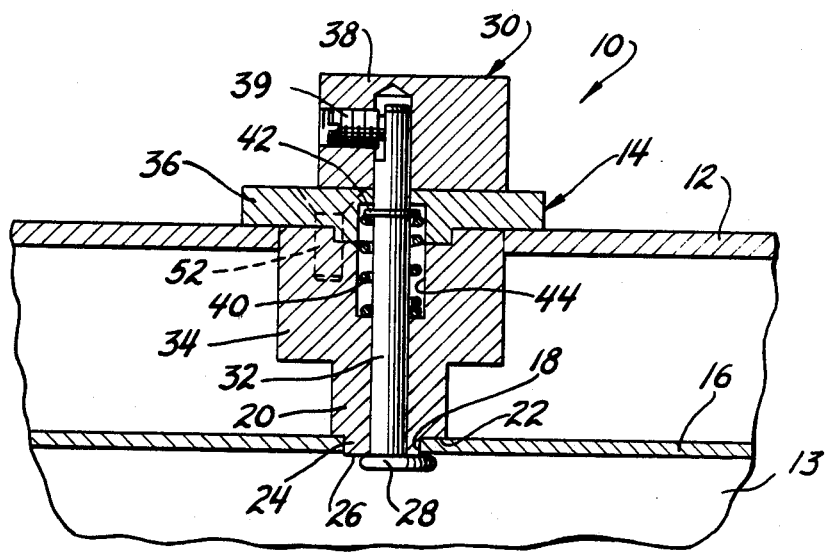
FIG. 2 is a side cross-sectional view of the subject invention in a retention position.

A mold assembly constructed in accordance with the present invention is generally shown at 10 in FIG. 1. The assembly 10 includes at least one mold part 12 which defines a mold cavity to receive plastic material. The remainder of the mold cavity is defined by conventional mold parts (not shown). An insert-supporting assembly, generally indicated at 14, is attached to the mold part 12. The insert-supporting assembly 14 extends from the mold part 12 to support an insert 16. The insert-supporting assembly 14 extends below the mold part 12 and through a hole 18 in the insert 16 to support the insert 16 in space within the cavity while plastic material is molded about the insert 16. Specifically, an alignment means includes an extremity 20 with a seating surface 22, and a projection 24, receives the insert 16 by extending through and engaging the hole 18 of the insert 16, while a retaining means including a retaining member 28 rotates between a receiving position shown in FIG. 1 and a retaining position shown in FIG. 2. When the retaining means is in the receiving position, the insert-supporting assembly moves through or engages the hole 18 in the insert 16 to be disposed about the alignment means. While the retaining means is in the retaining position, the insert 16 is engaged by the retaining means about the hole 18 on the opposite extremity of the hole 18 from the alignment means for retaining the insert 16 in position within the cavity so that plastic material may be disposed thereabout.

The alignment means includes the extremity 20 which is positioned immediately above the insert 16 when the insert 16 is retained by the insert-supporting assembly 14. Specifically, the extremity 20 includes the seating surface 22 which engages the top surface of the insert 16 about the hole 18, and the projection 24 which extends from the seating surface 22 to a distal end 26 so that the hole 18 in the insert 16 may be disposed about the projection 24 of the alignment means.

The retaining means includes the retaining member 28 which is located at the distal end 26 of the alignment means. The retaining member 28 has a periphery or surface contour that is disposed laterally within the periphery or contour of the distal end 26 of said projection 24 while the insert supporting assembly is in the insert-receiving position shown in FIG. 2. At least a portion of the periphery or outer contour of the retaining member 28 is disposed laterally outside of the periphery of the distal end 26 of the projection 24 when the insert-supporting assembly 14 is in the insert-retaining position shown in FIG. 2. In other words, the retaining member 28 of the insert-supporting assembly 14 is rotatable between an insert-receiving position wherein it can move through the hole 18 in the insert 16, and an insert-retaining position at which a portion of the periphery of the retaining member 28 extends in a lateral direction beyond the contour or periphery of the projection 24. The insert 16 may be disposed against said seating surface 22 of the alignment means with the projection 24 extending through the hole 18 in the insert 16 while the retaining member 28 is in the receiving position shown in FIG. 1. The retaining member 28 is then rotated to the retaining position shown in FIG. 2 to secure the insert 16 between the retaining member 28 and the distal end 26 of the projection 24.

The assembly includes an actuation means generally indicated at 30. It includes a spacer body. The actuation means 30, comprising a shaft 32 and handle 38, moves or rotates the retaining member 28 between the receiving position and the retaining position. The handle 38 of the actuation means 30 is located above the mold part 12. Rotation of the handle 38 is transmitted through the shaft 32 to rotate the retaining member 28 from an alignment position to a retention position.

Figure 4:
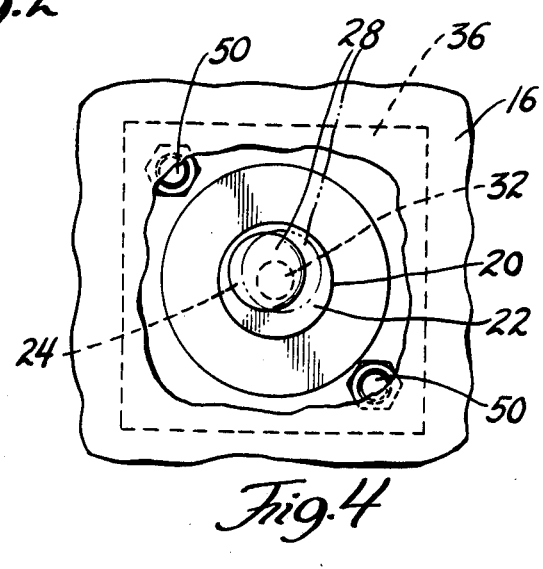
FIG. 4 is a bottom view taken along line 4—4 of FIG. 1, and partially broken away.

In the specific embodiment illustrated, the projection 24 of the alignment means and the retaining member 28 are circular cross sections of equal diameters, i.e., the projection 24 is cylindrical and the member 28 is disc-shaped. The disc-shaped member 28 is shown in the retaining positions in phantom in FIG. 4.

The shaft 32 of the actuation means 30 is connected to the handle 38 by a flat and set screw 39. The shaft 32 is connected to or integral with the retaining member 28. The shaft extends through the projection 24 of the alignment means with the axis of the shaft eccentrically disposed relative to the center of the circular projection 24. Thus, the shaft 32 and the projection 24 have differing center points or axes. Similarly, the shaft 32 is connected to the retaining member 28 in an identical eccentric fashion.

The insert-supporting assembly 14 includes a biasing means comprising of a spring 40 and ring 42 disposed within a cavity 44. The spring 40 forces the shaft 32 into the projection 24 while urging the retaining member 28 against the distal end 26 of the projection 24. In other words, the biasing means exerts a force upwards towards the handle 38 of the actuation means, to urge both the shaft 32 and the retaining member 28 upwardly. The spring 40 reacts between the body 34 and the shaft 32. The snap ring 42 is secured to the shaft 32 to engage one end of the spring 40, while the cavity 44 within the body 34 provides an edge to engage the other end of the spring 40.

The alignment means includes a body 34 and a support means or plate 36. The support plate 36 is located between the body 34 and the handle 38, and rests on top of the mold lid 12. The shaft 32 extends through the body 34 and the plate 36 to the exterior of the mold part 12.

Figure 3:
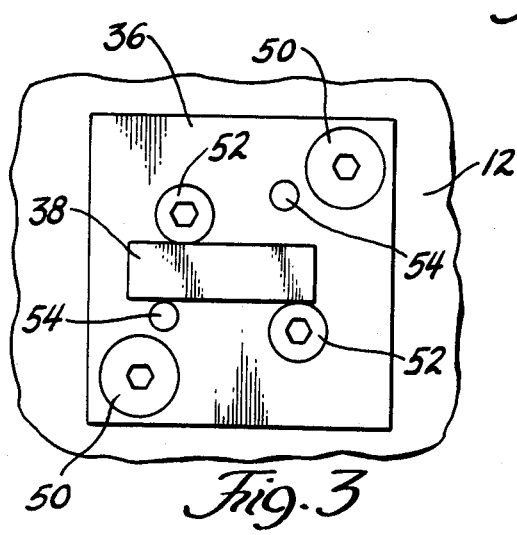
FIG. 3 is a top view of the subject invention taken along line 3—3 of FIG. 1.

In the illustrated embodiment, the handle 38 and the support means 36 are rectangular in shape, while the body 34 is cylindrical. Referring to FIG. 3, the support means 36 is fastened to the mold part 12 by means of screws 50. A second pair of screws 52 fastens the support plate 36 to the body 34. At the top of the support plate 36 there is included a pair of spring-loaded detents 54 which can check or arrest the degree of rotation of the handle member 38.

The invention provides a device for supporting a mold insert in space inside a mold cavity. A pilot and keeper assembly rests on the top of a mold part and extends into a mold cavity and through a small hole in the mold insert. Movement of a handle, which is part of the pilot and keeper assembly of the mold part, is transmitted through a shaft to a retaining means, which engages the opposite extremity of the hole to retain the insert in position during molding operations. After plastic is inserted into the base of the mold cavity and a sufficient curing time has transpired, the handle is rotated back to its initial position, thereby returning the retaining means to a nonretention position, and the pilot and keeper assembly is withdrawn from the mold.

The spring 40 reacts between the body 34 and the shaft 32. The snap ring 42 is secured to the shaft 32 to engage one end of the spring 40, while the cavity 44 within the body 34 provides an edge or step to engage the other end of the spring 40.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that the invention may be practiced otherwise than as specifically described herein and yet remain within the scope of the appended claims.

We claim:

1. An insert support assembly for holding an insert in a spaced relationship to an insert support and wherein the insert is a flat plate with opposite surfaces and has a hole therein, the combination of: a spacer body including an alignment portion for piloting the insert and supporting the insert, said alignment portion including a seating surface of a diameter greater than that of said hole, said seating surface engaging the insert on one surface of the insert at the hole in the insert, said alignment portion further including a pin portion having a diameter complementary to that of said hole, said pin portion extensible through said hole, a shaft having an axis eccentric to said hole and extending through said pin portion, said shaft having a round retaining segment thereon with a diameter complementary to that of said hole and having a release position wherein said pin portion, retaining segment and hole are axially aligned for allowing said pin portion to enter said hole, said retaining segment having a locked position wherein said shaft locates said retaining segment to engage the insert on the opposite surface of the insert for holding the insert in spaced position with respect to the insert support.

2. An assembly as set forth in claim 1 including actuation means for moving said retaining segment between said receiving position and said retaining position.

3. An assembly as set forth in claim 2 wherein said pin portion and said retaining segment are circular and of equal diameters.

4. An assembly as set forth in claim 1 including biasing means for biasing said shaft into said pin portion to urge said retaining segment against said distal end of said projection.

5. An assembly as set forth in claim 1 wherein said biasing means includes a spring reacting between said body and said shaft.

* * * * *